A. M. SONNICHSEN.
ATTACHMENT FOR HARVESTER REELS.
APPLICATION FILED OCT. 25, 1907.

925,664.

Patented June 22, 1909.
2 SHEETS—SHEET 1.

WITNESSES:

INVENTOR
Andreas M. Sonnichsen
By Erwin & Wheeler
ATTORNEYS.

A. M. SONNICHSEN.
ATTACHMENT FOR HARVESTER REELS.
APPLICATION FILED OCT. 25, 1907.

925,664.

Patented June 22, 1909.
2 SHEETS—SHEET 2.

WITNESSES:

INVENTOR
Andreas M. Sonnichsen
By Erwin & Wheeler
ATTORNEYS.

UNITED STATES PATENT OFFICE.

ANDREAS M. SONNICHSEN, OF MILWAUKEE, WISCONSIN, ASSIGNOR TO J. T. BRETT GRAIN SAVER CO., OF MILWAUKEE, WISCONSIN, A CORPORATION OF WISCONSIN.

ATTACHMENT FOR HARVESTER-REELS.

No. 925,664.    Specification of Letters Patent.    Patented June 22, 1909.

Application filed October 25, 1907. Serial No. 399,074.

*To all whom it may concern:*

Be it known that I, ANDREAS M. SONNICHSEN, a citizen of the United States, residing at Milwaukee, county of Milwaukee, and State of Wisconsin, have invented new and useful Improvements in Attachments for Harvester-Reels, of which the following is a specification.

My invention relates to improvements in attachments for harvester reels.

The object of my invention is to provide simple and reliable means for manipulating rake teeth carried by the reel, whereby such teeth will be adjusted to raking position during the downward stroke and swung to a trailing position during the upward stroke, thus permitting the teeth to withdraw cleanly from the straw after picking up lodged straw and lifting it to the position where it will be properly cut by the sickle.

Figure 1:
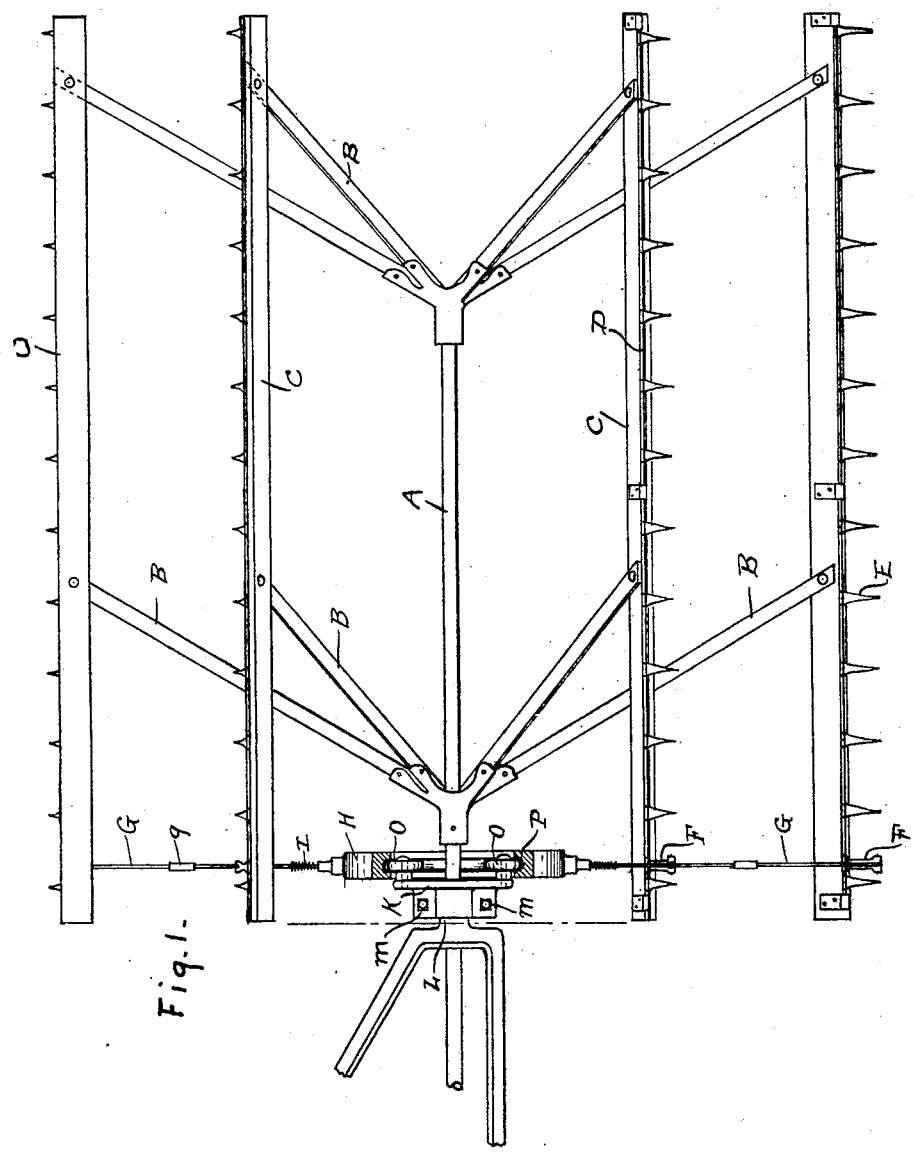
Figure 2:
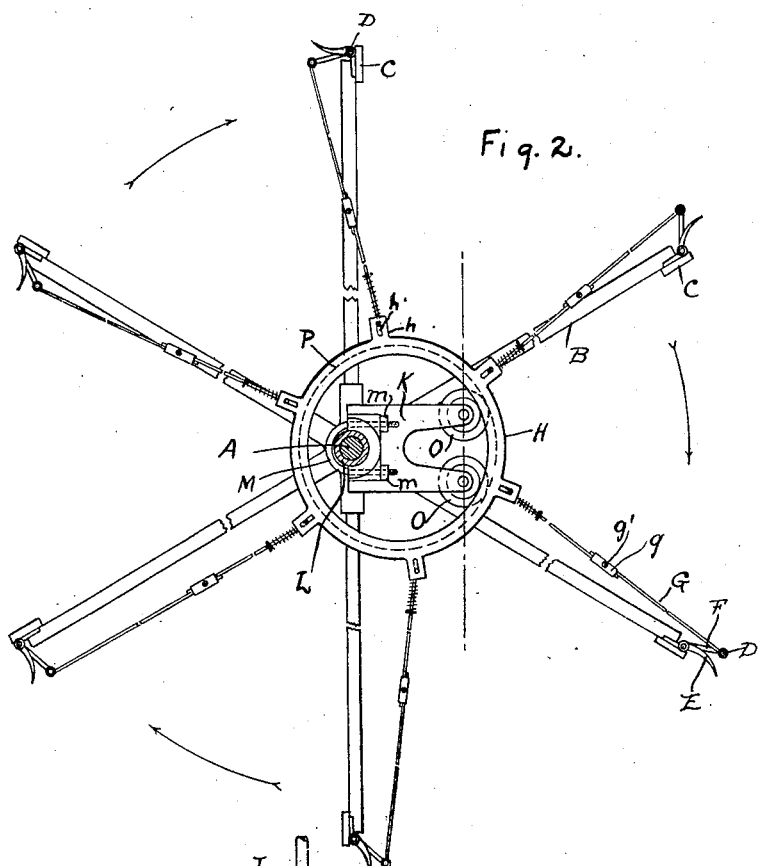
Figure 3:
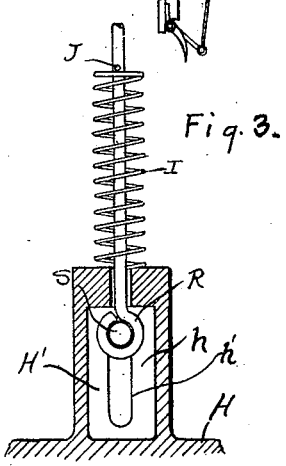

In the following description reference is had to the accompanying drawings, in which, Figure 1 is an elevation of a reel embodying my invention. Fig. 2 is a view of the same as seen from the inner end, the reel supporting shaft being illustrated in cross section. Fig. 3 is an enlarged detail sectional view of the connection between the eccentric ring and one of the link rods.

Like parts are identified by the same reference characters throughout the several views.

A is a reel supporting shaft, B the radial arms of the reel and C the reel bars or bats. Rods D are mounted upon suitable supports in a position to extend longitudinally along the rear surface of the bar C, preferably in close proximity to such bars and supported therefrom. These bars are mounted in bearings which permit an axial rotation and they are provided with rake teeth E. They are also provided near their inner ends with outwardly projecting arms F, connected by link rods G with the ring H encircling the shaft A, but eccentric thereto. The rods G are formed in sections, adjustably connected with each other by a coupling member *g*, in which they are locked by means of set screws *g'*. The inner sections of these link rods are loosely engaged in sockets H' in slotted projections *h* on the ring H, the slots *h'* being arranged to extend radially so as to permit a lineal movement of the link rod. The inner end of the inner section of the link rod is provided with an eye R which is loosely engaged in the socket H'. A bolt S passes loosely through the slots *h'* and through the eye R of the link rod, thus movably connecting the link rod with the projection *h*. Buffer springs I are interposed between the projections *h* and a cross pin J on the link rod, these springs being arranged to push the link rods outwardly as far as the slots *h'* will permit them to move. In case the rake teeth meet with unusual resistance, however, they are permitted to yield before the strain reaches the breaking point by pushing the link rods inwardly against the tension of the buffer springs I.

A bracket K is rigidly mounted upon a stationary collar L to which it is clamped by a yoke belt M and nuts *m*, and rollers O, mounted on this bracket, are adapted to enter a channel P in the ring H and support the ring in a position eccentric to the shaft A, the ring being otherwise supported entirely from the rods D by means of the arms E and link rod connections.

It will be observed that the bracket K, being supported in a stationary position from the frame sleeve L, a rotation of the reel will be communicated to the ring H, and as the latter revolves, each of the link rods will be pushed outwardly on the side occupied by the rollers O, thus causing the rake teeth to swing outwardly to a radially projecting position adapted to pick up fallen grain. The teeth of any given rake bar begin to retract as the corresponding reel arms B reach a vertical position and the retracting movement continues on the upwardly moving side of the reel, so that the teeth will withdraw from the tangled straw. The bracket K can be adjusted on the collar L to any desired position by loosening the nuts *m*, and by this means the retracting movement can be made to commence at any desired point in the circle of revolution.

Having thus described my invention what I claim as new and desire to secure by Letters Patent is,

1. A reel provided with peripheral wings and axially oscillatory tooth supporting bars and rake teeth mounted thereon, in combination with a rotary ring mounted upon a stationary support eccentric to the axis of the reel and arms rigidly connected with said bars and adjustable stays connecting such arms with said ring.

2. A reel provided with fixed peripheral wings and oscillatory tooth supporting bars mounted thereon, in combination with a rotary ring mounted upon a stationary support eccentric to the axis of the reel, arms connected with the oscillatory bars and link rods connecting each of said arms with said ring.

3. A reel provided with peripheral axially oscillatory tooth supporting bars and rake teeth mounted thereon, in combination with a rotary ring mounted upon a stationary support eccentric to the axis of the reel, arms connected with said bars and link rods connecting each of said arms with said ring, said link rods being formed in adjustable sections and the inner sections being resiliently connected with the ring.

4. The combination with a reel supporting shaft, a reel mounted thereon, tooth supporting members mounted for axial rotation near the periphery of the reel, rake teeth mounted on said members and an actuating arm connected with each of such members, of a rotary ring encircling the shaft, a fixed bracket supporting said ring in a position eccentric to the shaft, and link connections between the ring and the actuating arms of the tooth supporting members, said ring being provided with an annular channel in its inner surface and said bracket being provided with rollers engaging in said channel on one side of the reel supporting shaft.

In testimony whereof I affix my signature in the presence of two witnesses.

ANDREAS M. SONNICHSEN.

Witnesses:
O. R. ERWIN,
LEVERETT C. WHEELER.